United States Patent
Finman et al.

(10) Patent No.: US 10,885,714 B2
(45) Date of Patent: Jan. 5, 2021

(54) CLOUD ENABLED AUGMENTED REALITY

(71) Applicant: Niantic, Inc., San Francisco, CA (US)

(72) Inventors: Ross Edward Finman, Redwood City, CA (US); Si ying Diana Hu, Mountain View, CA (US)

(73) Assignee: Niantic, Inc., San Francisco, CA (US)

( * ) Notice: Subject to any disclaimer, the term of this patent is extended or adjusted under 35 U.S.C. 154(b) by 88 days.

(21) Appl. No.: 16/029,530

(22) Filed: Jul. 6, 2018

(65) Prior Publication Data

US 2019/0012840 A1     Jan. 10, 2019

Related U.S. Application Data

(60) Provisional application No. 62/529,492, filed on Jul. 7, 2017.

(51) Int. Cl.
*G06T 19/00*     (2011.01)
*G06T 17/05*     (2011.01)

(52) U.S. Cl.
CPC ............ *G06T 19/006* (2013.01); *G06T 17/05* (2013.01); *G06T 2200/04* (2013.01); *G06T 2200/08* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 9,984,499 B1* | 5/2018 | Jurgenson | ............ G06T 19/006 |
| 2005/0286758 A1 | 12/2005 | Zitnick, III et al. | |
| 2012/0166074 A1* | 6/2012 | Weng | ............ G01C 21/32 |
| | | | 701/409 |
| 2012/0249544 A1 | 10/2012 | Maciocci et al. | |
| 2013/0169626 A1 | 7/2013 | Balan et al. | |
| 2013/0249947 A1* | 9/2013 | Reitan | ............ G06T 19/006 |
| | | | 345/633 |
| 2015/0206343 A1* | 7/2015 | Mattila | ............ G06T 19/006 |
| | | | 345/420 |
| 2015/0235432 A1 | 8/2015 | Bronder et al. | |
| 2015/0371393 A1 | 12/2015 | Ramachandra et al. | |
| 2016/0210525 A1 | 7/2016 | Yang et al. | |

(Continued)

OTHER PUBLICATIONS

PCT International Search Report and Written Opinion, PCT Application No. PCT/US2018/041164, dated Sep. 21, 2018, 22 pages.

*Primary Examiner* — Hilina K Demeter

(74) *Attorney, Agent, or Firm* — Fenwick & West LLP

(57) ABSTRACT

An augmented reality system generates computer-mediated reality on a client device. The client device has sensors including a camera configured to capture image data of an environment and a location sensor to capture location data describing a geolocation of the client device. The client device creates a three-dimensional (3-D) map with the image data and the location data for use in generating virtual objects to augment reality. The client device transmits the created 3-D map to an external server that may utilize the 3-D map to update a world map stored on the external server. The external server sends a local portion of the world map to the client device. The client device determines a distance between the client device and a mapping point to generate a computer-mediated reality image at the mapping point to be displayed on the client device.

19 Claims, 4 Drawing Sheets

(56) References Cited

U.S. PATENT DOCUMENTS

| | | | |
|---|---|---|---|
| 2016/0239181 A1* | 8/2016 | You | G06F 3/04815 |
| 2017/0124713 A1* | 5/2017 | Jurgenson | G06T 7/246 |
| 2017/0243403 A1* | 8/2017 | Daniels | G06T 19/20 |
| 2018/0005393 A1* | 1/2018 | Senthamil | G06T 7/80 |
| 2018/0253900 A1* | 9/2018 | Finding | G02B 27/017 |

\* cited by examiner

CLOUD ENABLED AUGMENTED REALITY

CROSS REFERENCE TO RELATED APPLICATIONS

This application claims the benefit of U.S. Provisional Application No. 62/529,492, filed Jul. 7, 2017, which is incorporated by reference in its entirety.

FIELD OF THE DISCLOSURE

The present disclosure relates generally to computer-mediated reality systems, and more particularly, to an augmented reality (AR) system that generates 3-D maps from data gathered by client devices.

BACKGROUND

Computer-mediated reality technologies allow a user with a handheld or wearable device to add, subtract, or otherwise alter their visual or audible perception of their environment, as viewed through the device. Augmented reality (AR) is at type of computer-mediated reality that specifically alters a real time perception of a physical, real-world environment using sensory input generated at the computing device.

SUMMARY

According to a particular embodiment, a method generates computer-mediated reality data. The method includes generating three-dimensional (3-D) map data and camera location data at a client device. The method also includes transmitting the 3-D map data and the client data to an external server, receiving world map data at the client device from the external server, and generating a computer mediated reality image at the client device. The world map data may be generated using the 3-D map data.

According to another particular embodiment, an augmented reality engine including a locally-stored animation engine is executed on a portable computer. The animation engine includes a first input that receives a stream of digital images produced by a camera integrated in the portable computer. The digital images may represent a near real-time view of the environment seen by the camera. The animation engine also includes a second input that receives a geolocation position from a geolocation positioning system integrated in the portable computer, a 3D mapping engine that receives the first input and second input and estimates the distance between a camera position at a particular point in time and one or more mapping points, and an output that includes the stream of digital images produced by the camera overlaid with a computer-generated image. The computer generated image may be located in a particular position in the 3D map and remains positioned in the particular position as the user moves the camera to different positions in space. A non-locally stored object detection engine in networked communication with the locally-stored animation engine may be used to detect objects in the 3D map and return an indication of the detected objects (e.g., a location and identification, such as a type) to the portable computer. The object detection engine may use a first input received from the locally-stored animation engine that includes a digital image from the stream of digital images produced by the camera and a second input received from the locally-stored animation engine that includes the geolocation position associated with the digital image received from the locally-stored animation engine.

Other features and advantages of the present disclosure are described below.

DETAILED DESCRIPTION

Figure 1:
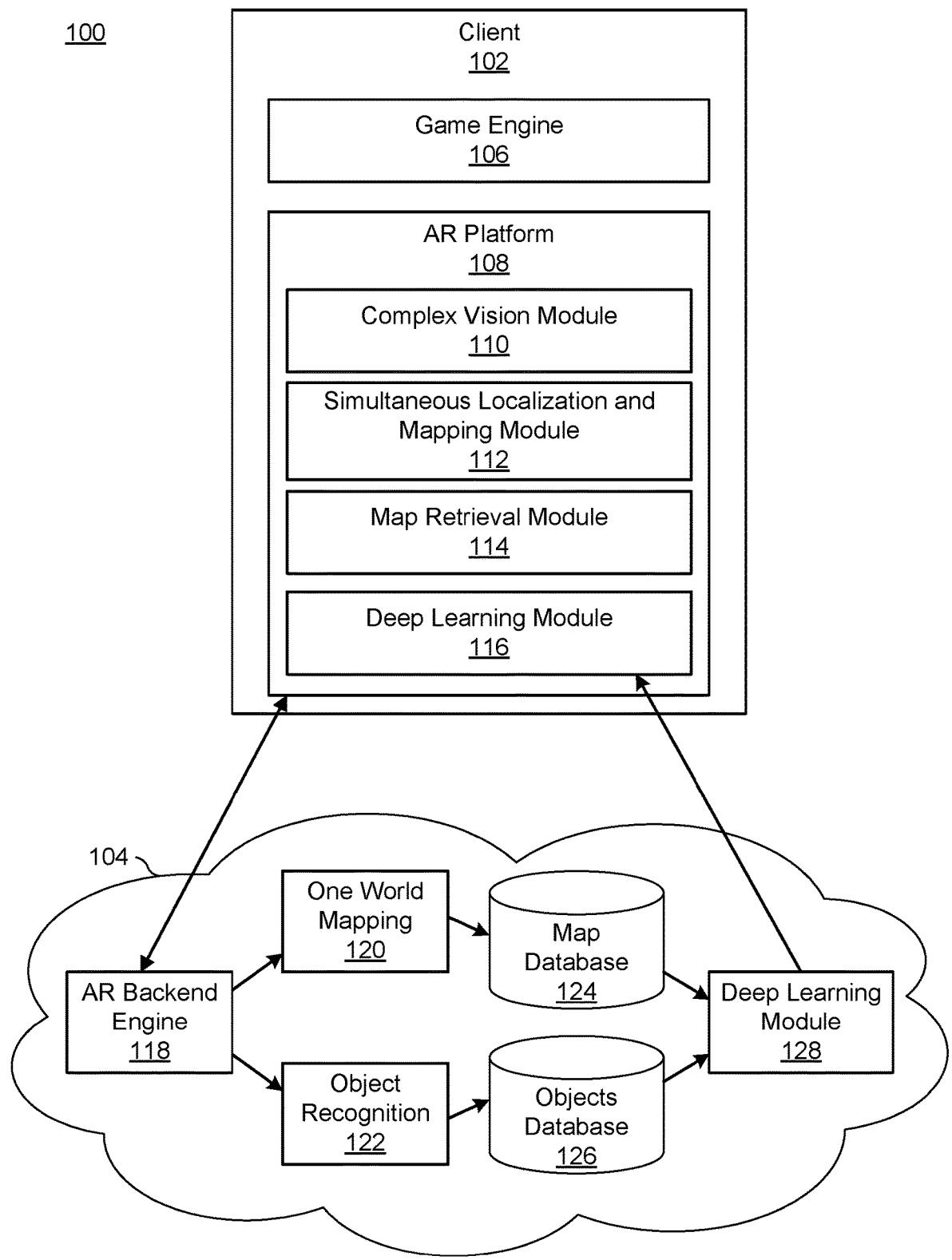
FIG. 1 shows a networked computing environment for generating and displaying augmented reality data, according to an embodiment.

A system and method creates a three-dimensional (3-D) map (e.g., with resolution on the order of a centimeter) and then uses that 3-D map to enable interactions with the real world. In various embodiments, the mapping is accomplished on the client side (e.g., a phone or headset) and is paired with a backend server that provides previously compiled imagery and mapping back to the client device.

In one embodiment, the system selects images and global positioning system (GPS) coordinates on a client side (e.g., on a handheld or worn electronic device) and pairs the selected data with a 3-D map. The 3-D map is built from camera recording modules and an inertial measurement unit (IMU), such as accelerometer or gyroscope. The client data is sent to the server. The server and a client side computing devices process data together to establish the objects and geometry, as well as to determine potential interactions. Examples of potential interactions include those that are made in a room with AR animations.

Through use of the image and the 3-D map together, the system may accomplish object detection and geometry estimation using neural networks or other types of models. An example of a neural network is a computational model used in machine learning which use a large collection of connected simple units (artificial neurons). The units connect together in software, and if the combined input signal is large enough, the units fire their own output signal. The system may use deep learning (e.g., a multi-layer neural network) to contextually understand AR data. Other types of models may include other statistical models or other machine learning models In some embodiments, the system aggregates local maps to create one or more global maps (e.g., by linking local maps together). The aggregated maps are combined together into a global map on the server to generate a digital map of the environment, or "world." For example, two local maps generated by one or more devices for any combination of similar GPS coordinates, similar images, and similar sensor data that include portions that match within a predetermined threshold may be determined to overlap. Thus, the overlapping portions can be used to stitch the two local maps together that may aid in obtaining a global coordinate system that has consistency with a world map and the local maps (e.g., as part of generating the global map). The world map is used to remember previously stored animations in a map that is stored at specific GPS coordinates and further indexed through 3-D points and visual images down to the specific place in the world (e.g., with a resolution on the order of one foot).

Illustrative processes map data to and from the cloud. As described herein, a map is a collection of 3-D points in space that represent the world, in a manner analogous to 3-D pixels. Image data is sent along with the 3-D maps when available and useful. Certain examples send 3-D map data without image data.

In various embodiments, a client device uses 3-D algorithms executed by a processor to generate the 3-D map. The client device sends images, the 3-D map, GPS data, and any other sensor data (e.g., IMU data, any other location data) in an efficient manner. For instance, images may be selectively sent so as to not to bog down transmission or processing. In one example, images may be selectively sent when there is a novel viewpoint but not when images have already been provided for the current viewpoint. An image, for instance, is designated for sending by the algorithm when the field of view of a camera has minimal overlap with previous images from past or recent camera poses, or when the viewpoint has not been observed for an amount of time dependent on the expected movements of the objects. As another example, images may be provided if more than a threshold amount of time has elapsed since a previous image from the current (or a substantially overlapping) viewpoint was provided. This may enable the stored images associated with the map to be updated to reflect a more current (or at least a recent) status of the real world location.

In various embodiments, the cloud side device includes a real time detection system based on 3-D data and images to detect objects, and estimates geometry of the real-world environment. For example, a 3-D map of a room that is not photorealistic (e.g., semi-dense and/or dense 3-D reconstruction), may be determinable with images.

The server fuses together the images and 3-D data with the detection system to build a consistent and readily indexed 3-D map of the world, or composite real world map using GPS data. Once stored, the real world map is searched to locate previously stored real world map and associated animations.

In various embodiments, mapping and tracking is done on the client side. A sparse reconstruction of the real world (digitizing the world) is gathered, along with a location of the camera relative to the real world. Mapping includes creating a point cloud, or collection of 3-D points. The system communicates the sparse representation back to server by serializing and transmitting the point cloud information, along with GPS data. Cloud processing enables multiplayer capabilities (sharing map data between independent devices in real or close to real time) have working physical memory (storing map and animation data for future experiences not stored locally on the device) and object detection.

The server includes a database of maps and images. The server uses the GPS data to determine if a real world map has been previously stored for the coordinates. If located, the stored map is transmitted back to the client device. For example, a user at a home location may receive previously stored data associated with the home location. Additionally, the map and image data can be added to a stored, composite real world.

FIG. 1 is a block diagram of an AR computing system 100 that includes a client device 102 cooperating with elements accessed via a network 104, according to an embodiment. For example, the elements may be components of a server device to produce AR data. The client device 102 includes, for example, a game engine 106 (e.g., the Unity game engine or another physics/rendering engine) and an AR platform 108. The AR platform 108 may execute segmentation and object recognition. The AR platform 108 shown in FIG. 1 includes a complex computer vision module 110 that executes the client-side image processing (including image segmentation and local 3-D estimation, etc.).

The AR platform 108 also includes a simultaneous localization and mapping (e.g., SLAM) module 112. In one embodiment, the SLAM 112 functions include a mapping system that builds up point cloud and tracking to find the location of the camera in space. The SLAM processes of the example further re-project animation or an augmented value back into the real word. In other embodiments, the SLAM 112 may use different or additional approaches to mapping the environment around a client device 102 and/or determining the client device's 102 location in that environment.

In the embodiment of FIG. 1, the AR platform 108 also includes a map retrieval module 114 and a deep learning module 116 for object recognition. The map retrieval module 114 retrieves previously generated maps (e.g., via the network 104). In some embodiments, the map retrieval module 114 may store some maps (e.g., a map for a user's home location) locally. The deep learning module 116 applies machine-learned algorithms for object recognition. The deep learning module 116 may obtain the machine-learned algorithms after training on an external system (e.g., via the network 104). In some embodiments, the deep learning module 116 may also provide results of object recognition and/or user feedback to enable further model training.

In the embodiment shown, the components accessed via the network 104 (e.g., at a server computing device) include an AR backend engine 118 in communication with a one world mapping module 120, an object recognition module 122, a map database 124, an objects database 126, and a deep learning training module 128. In other embodiments, additional or different components may be included. Furthermore, the functionality may be distributed differently than described herein. For example, some or all of the object recognition functionality may be performed at the client device 102.

The one world mapping module 120 fuses different local maps together to create a composite real world map. As noted previously, GPS position data from the client device 102 that initially generated the map may be used to identify local maps that are likely to be adjacent or overlapping. Pattern matching may then be used to identify overlapping portions of the maps or that two local maps are adjacent to each other (e.g., because they include representations of opposite sides of the same object). If two local maps are determined to overlap or be adjacent, a mapping can be stored (e.g., in the map database) indicating how the two maps relate to each other. The one world mapping module 120 may continue fusing together local maps as received from one or more client devices 102 to continue improving the composite real world map. In some embodiments, improvements by the one world mapping module 120 may include expanding the composite real world map, filling in missing portions of the composite real world map, updating portions of the composite real world map, aggregating overlapping portions from local maps received from multiple client devices 102, etc. The one world mapping module 120 may further process the composite real world map for more efficient retrieval by map retrieval modules 114 of various client devices 102. In some embodiments, processing of the composite real world map may include subdividing the composite real world map into one or more layers of tiles and tagging of various portions of the composite real world map. The layers may correlate to different zooms such that at a lower level more detail of the composite real world map may be stored compared to a higher level.

The object recognition module 122 uses object information from captured images and collected 3-D data to identify features in the real world that are represented in the data. In this manner, the network 104 determines that a chair, for example, is at a 3-D location and accesses an object database 126 associated with the location. The deep learning module 128 may be used to fuse the map information with the object information. In this manner, the AR computing system 100 may connect 3-D information for object recognition and for fusion back into a map. The object recognition module 122 may continually receive object information from captured images from various client devices 102 to add various objects identified in captured images to add to the object database 126. In some embodiments, the object recognition module 122 may further distinguish detected objects in captured images into various categories. In one embodiment, the object recognition module 122 may identify objects in captured images as stationary or temporary. For example, the object recognition module 122 determines a tree to be a stationary object. In subsequent instances, the object recognition module 122 may less frequently update the stationary objects compared to objects that might be determined to be temporary. For example, the object recognition module 122 determines an animal in a captured image to be temporary and may remove the object if in a subsequent image the animal is no longer present in the environment.

The map database 124 includes one or more computer-readable media configured to store the map data generated by client devices 102. The map data can include local maps of 3-D point clouds stored in association with images and other sensor data collected by client devices 102 at a location. The map data may also include mapping information indicating the geographic relationship between different local maps. Similarly, the objects database 126 includes one or more computer-readable media configured to store information about recognized objects. For example, the objects database 126 might include a list of known objects (e.g., chairs, desks, trees, buildings, etc.) with corresponding locations along with properties of those objects. The properties may be generic to an object type or defined specifically for each instance of the object (e.g., all chairs might be considered furniture but the location of each chair may be defined individually). The object database 126 may further distinguish objects based on the object type of each object. Object types can group all the objects in the object database 126 based on similar characteristics. For example, all objects of a plant object type could be objects that are identified by the object recognition module 122 or by the deep learning module 128 as plants such as trees, bushes, grass, vines, etc. Although the map database 124 and the objects database 126 are shown as single entities, they may be distributed across multiple storage media at multiple devices (e.g., as a distributed database).

Figure 2:
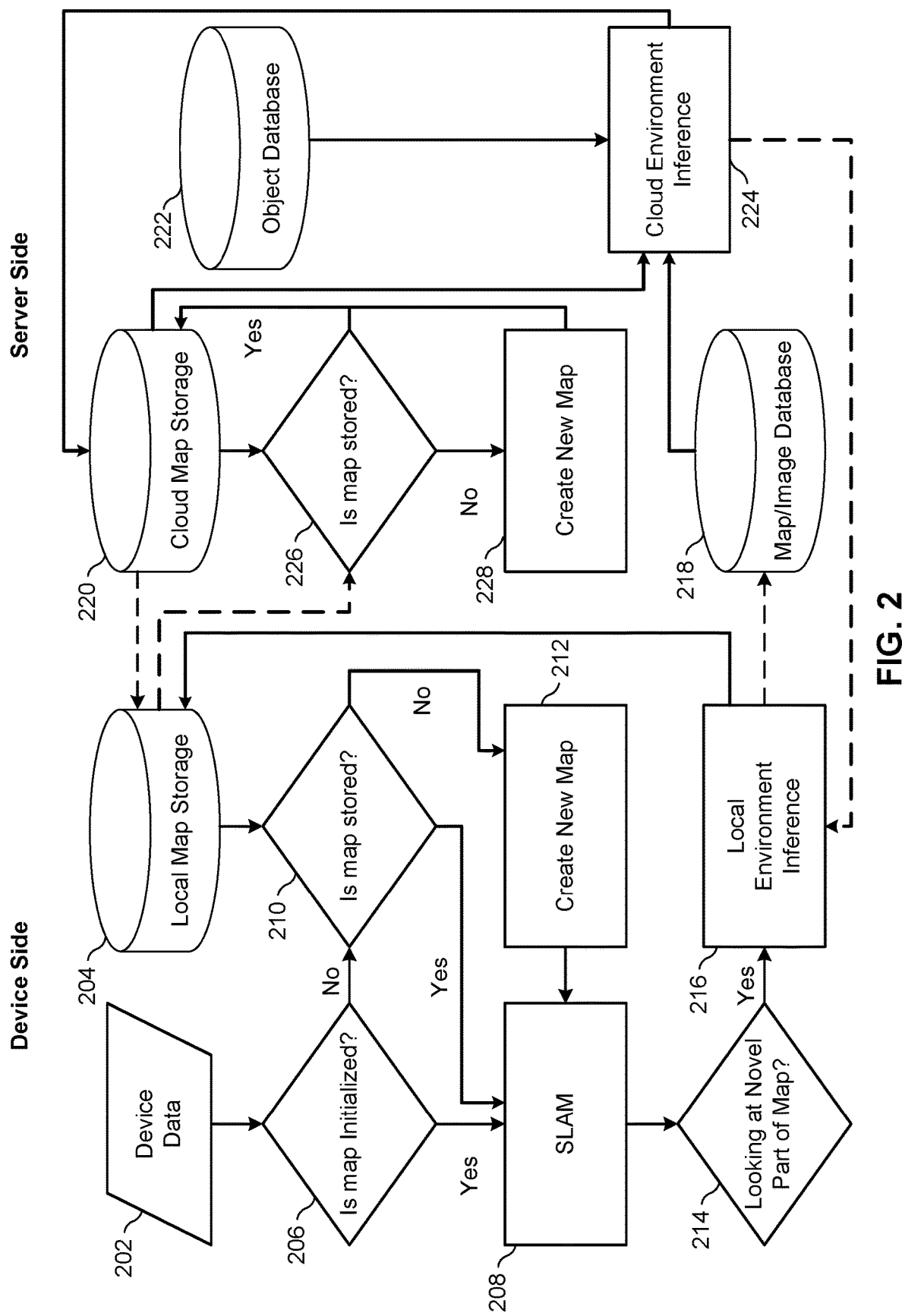
FIG. 2 is a flowchart that illustrates processes that are executable by the computing system of FIG. 1 for generating and displaying augmented reality data, according to an embodiment.

FIG. 2 is a flowchart showing processes executed by a client device 102 and a server device to generate and display AR data, according to an embodiment. The client device 102 and the server computing devices may be similar to those shown in FIG. 1. Dashed lines represent the communication of data between the client device 102 and server, while solid lines indicate the communication of data within a single device (e.g., within the client device 102 or within the server). In other embodiments, the functionality may be distributed differently between the devices and/or different devices may be used.

At 202, raw data is collected at the client device 102 by one or more sensors. In one embodiment, the raw data includes image data, inertial measurement data, and location data. The image data may be captured by one or more cameras which are linked to the client device 102 either physically or wirelessly. The inertial measurement data may be collected using a gyroscope, an accelerometer, or a combination thereof and may include inertial measurement data up to six degrees of freedom—i.e., three degrees of translation movements and three degrees of rotational movements. The location data may be collected with a global position system (GPS) receiver. Additional raw data may be collected by various other sensors, such as pressure levels, illumination levels, humidity levels, altitude levels, sound levels, audio data, etc. The raw data may be stored in the client device 102 in one or more storage modules which can record raw data historically taken by the various sensors of the client device 102.

The client device 102 may maintain a local map storage at 204. The local map storage includes local point cloud data. The point cloud data comprises positions in space that form a mesh surface that can be built up. The local map storage at 204 may include hierarchal caches of local point cloud data for easy retrieval for use by the client device 102. The local map storage at 204 may additionally include object information fused into the local point cloud data. The object information may specify various objects in the local point cloud data.

Once raw data is collected at 202, the client device 102 checks whether a map is initialized at 206. If a map is initialized at 206, then the client device 102 may initiate at 208 the SLAM functions. The SLAM functions include a mapping system that builds up point cloud and tracking to find the location of the camera in space on the initialized map. The SLAM processes of the example further re-project animation or an augmented value back into the real word. If no map was initialized at 210, the client device 102 may search the local map storage at 204 for a map that has been locally stored. If a map is found in the local map storage at 204, the client device 102 may retrieve that map for use by the SLAM functions. If no map is located at 210, then the client device 102 may use an initialization module to create a new map at 212.

Once a new map is created, the initialization module may store the newly created map in the local map storage at 204. The client device 102 may routinely synchronize map data in the local map storage 204 with the cloud map storage at 220 on the server side. When synchronizing map data, the local map storage 204 on the client device 102 may send the server any newly created maps. The server side at 226 checks the cloud map storage 220 whether the received map from the client device 102 has been previously stored in the cloud map storage 220. If not, then the server side generates a new map at 228 for storage in the cloud map storage 220. The server may alternatively append the new map at 228 to existing maps in the cloud map storage 220.

Back on the client side, the client device 102 determines whether a novel viewpoint is detected at 214. In some embodiments, the client device 102 determines whether each viewpoint in the stream of captured images has less than a threshold overlap with preexisting viewpoints stored on the client device 102 (e.g., the local map storage 204 may store viewpoints taken by the client device 102 or retrieved from the cloud map storage 220). In other embodiments, the client device 102 determines whether a novel viewpoint is detected 214 in a multi-step determination. At a high level, the client device 102 may retrieve any preexisting viewpoints within a local radius of the client device's 102 geolocation. From the preexisting viewpoints, the client device 102 may begin to identify similar objects or features in the viewpoint in question compared to the preexisting viewpoints. For example, the client device 102 identifies a tree in the viewpoint in question and may further reduce from the preexisting viewpoints within the local radius all preexisting viewpoints that also have trees visible. The client device 102 may use additional layers of filtration that are more robust in matching the viewpoint in question to the filtered set of preexisting viewpoints. In one example, the client device 102 uses a machine learning model to determine whether the viewpoint in question matches with another viewpoint in the filtered set (i.e., that the viewpoint in question is not novel because it matches an existing viewpoint). If a novel viewpoint is detected 214, then the client device 102 records at 216 data gathered by the local environment inference. For example, on determining that the client device 102 currently has a novel viewpoint, images captured with the novel viewpoint may be sent to the server (e.g., to a map/image database 218 on the server side). A novel viewpoint detector module may be used to determine when and how to transmit images with 3-D data. The local environment inference may include updated key frames for the local mapping system and serialized image and/or map data. The local environment inference may be used by the server to fit the novel viewpoint relative to the other viewpoints at a given location in the map.

On the server side, novel viewpoint data (e.g., comprising point cloud information with mesh data on top) may be stored at 218 in map/image database on the server side. The server may add different parts of a real world map from stored cloud map storage 220 and an object database 222. The cloud environment inference 224 (comprising the added component data) may be sent back to the client device. The added data may include points and meshes and object data having semantic labels (e.g., a wall or a bed) to be stored at local map storage 204.

Figure 3:
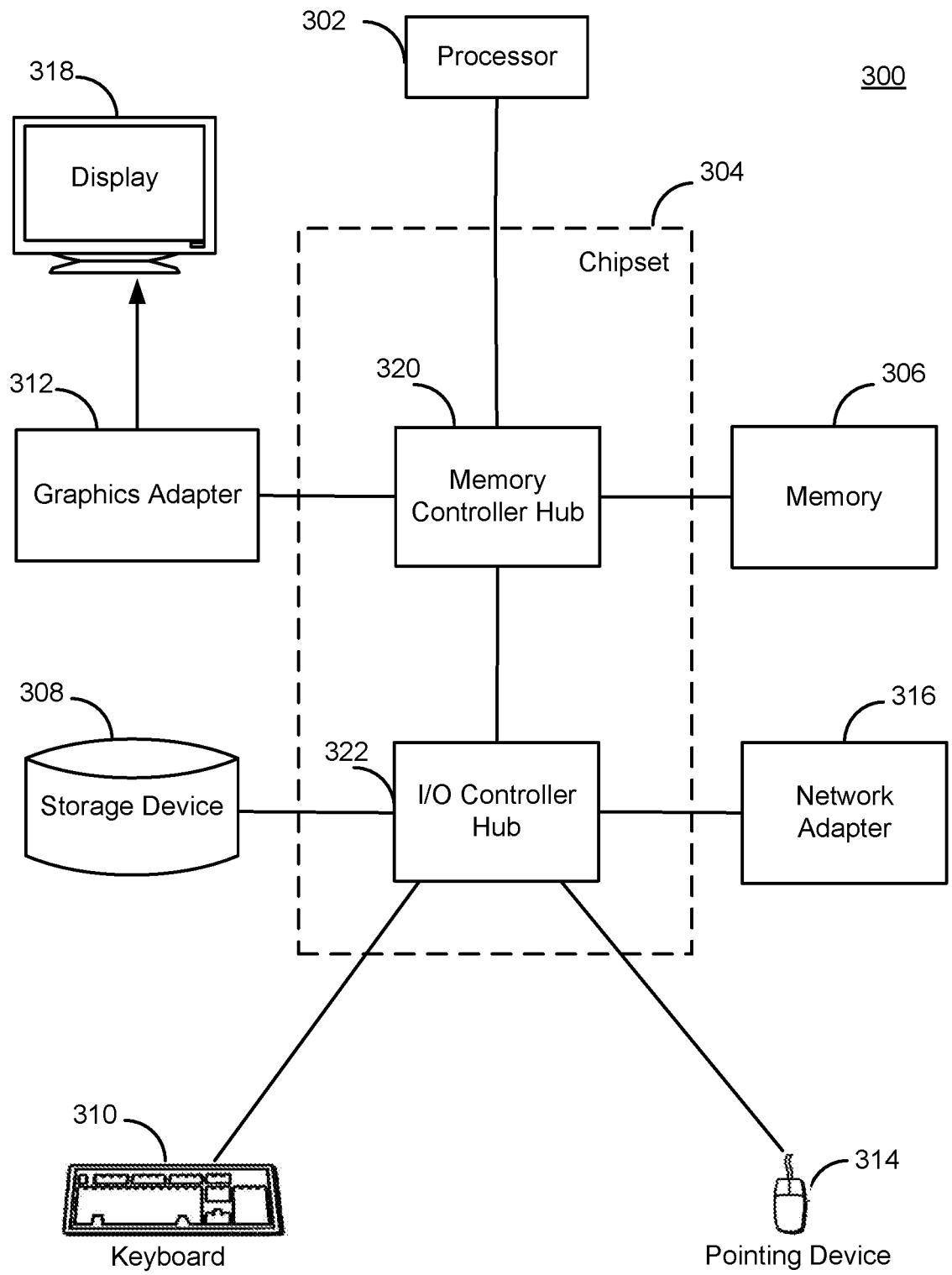
FIG. 3 is a high-level block diagram illustrating an example computer 300 suitable for use as a client device 102 or a server.

FIG. 3 is a high-level block diagram illustrating an example computer 300 suitable for use as a client device 102 or a server. The example computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, keyboard 310, pointing device 314, and network adapter 316 are coupled to the I/O controller hub 322. Other embodiments of the computer 300 have different architectures.

In the embodiment shown in FIG. 3, the storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, touch-screen, or other type of pointing device, and is used in combination with the keyboard 310 (which may be an on-screen keyboard) to input data into the computer system 300. In other embodiments, the computer 300 has various other input mechanisms such as touch screens, joysticks, buttons, scroll wheels, etc., or any combination thereof. The graphics adapter 312 displays images and other information on the display 318. The network adapter 316 couples the computer system 300 to one or more computer networks (e.g., the network adapter 316 may couple the client device 102 to the server via the network 104).

The types of computers used by the entities of FIG. 1 can vary depending upon the embodiment and the processing power required by the entity. For example, a server might include a distributed database system comprising multiple blade servers working together to provide the functionality described. Furthermore, the computers can lack some of the components described above, such as keyboards 310, graphics adapters 312, and displays 318.

Figure 4:
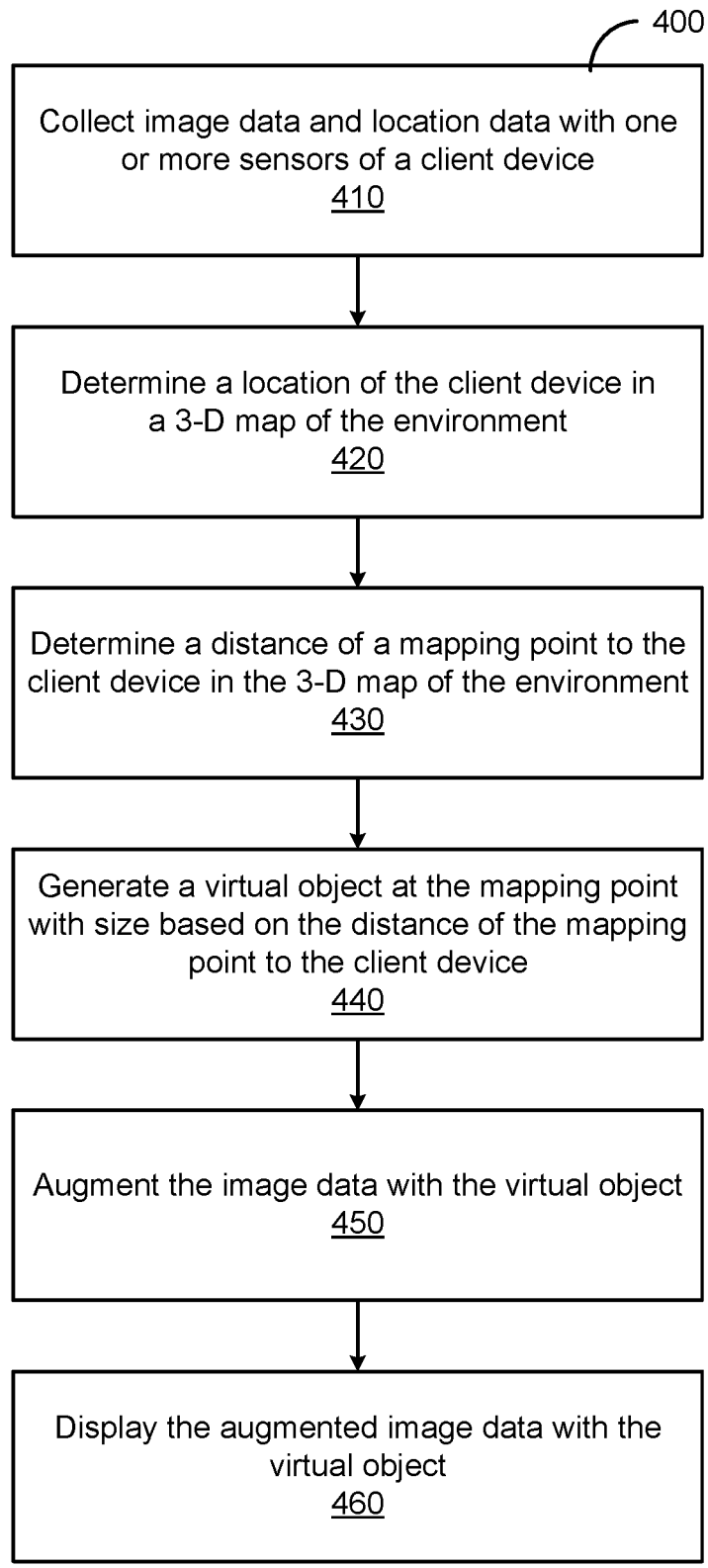
FIG. 4 is a flowchart illustrating augmentation 400 of images captured by a client device (e.g., the client device 102), according to an embodiment.

FIG. 4 is a flowchart illustrating augmentation 400 of images captured by a client device (e.g., the client device 102), according to an embodiment. The client device includes one or more sensors for recording image data and location data and one or more display devices for displaying augmented images.

The client device collects 410 image data and location data with one or more sensors on the client device. In one embodiment, the client device may utilize one or more cameras associated with the client device (e.g., cameras as components, cameras physically linked to the client device, or cameras wirelessly linked to the client device). The image data may also include video data stored as a video file or stored as individual frames from the video file. In another embodiment, the client device may utilize a GPS receiver, an inertial measurement unit (IMU), an accelerometer, a gyroscope, an altimeter, another sensor for determining spatial position of the client device, or some combination thereof to record location data of the client device.

The client device determines 420 a location of the client device in a 3-D map of the environment. In one embodiment, the client device generates a 3-D map of the environment based on image data or location data as collected. In another embodiment, the client device retrieves a portion of a 3-D map stored on an external system. For example, the client device retrieves a portion of a composite real world 3-D map from a server via a network (e.g., the network 104). The retrieved 3-D map comprises point cloud data that maps objects in the real world to spatial coordinates in the 3-D map. The client device then utilizes the location data to determine a spatial position of the client device within the 3-D map. In additional embodiments, the client device also utilizes the image data to aid in determining the spatial position of the client device within the 3-D map.

The client device determines 430 a distance of a mapping point to the client device in the 3-D map of the environment. The client device identifies a mapping point within the 3-D map and corresponding coordinates of the mapping point. For example, the client device identifies an object in the 3-D map, e.g., a tree, a sign, a bench, a fountain, etc. The client device then utilizes the coordinates of the identified mapping point as well as the location of the client device to determine a distance between the client device and the mapping point.

The client device generates 440 a virtual object at the mapping point with size based on the distance of the mapping point to the client device. The virtual object may be generated by an application programming interface of an executable application stored on the client device. The virtual object may also be transmitted by an external server to be positioned at the mapping point in the 3-D map. In some embodiments, the virtual object may be selected by the client device based on other sensory data collected by other sensors of the client device. The virtual object may vary in size based on the distance of the client device to the mapping point.

The client device augments 450 the image data with the virtual object. The size of the virtual object in the image data depends on the determined distance of the client device to the mapping point. The appearance of the virtual object in the image data may also vary based on other sensory data collected by the client device. In some embodiments, the client device updates the image data with the virtual object periodically, when an input is received by the client device corresponding to the virtual object (e.g., user input interacting with the virtual object), or when sensory data changes (e.g., movement of the client device rotationally or translationally, change in time of day, etc.).

The client device displays 460 the augmented image data with the virtual object. The client device may display on one or more displays the virtual object. In embodiments where the client device continually updates the augmented image data, the client device also updates the displays to reflect the updates to the augmentation of the image data.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

The invention claimed is:

1. A method of generating computer mediated reality data on a client device, the method comprising:
   capturing image data with a camera integrated in the client device, the image data representing a near real-time view of an environment around the client device;
   capturing location data with a location sensor integrated in the client device, the location data describing a spatial position of the client device in the environment;
   generating local map data based on the image data and the location data, the local map data including one or more three-dimensional (3D) point clouds spatially describing one or more objects in the environment around the client device;
   accessing a set of viewpoints stored locally on the client device based on the spatial position of the client device;
   identifying a first image in the image data as a novel viewpoint based at least in part on the first image having less than a minimum overlap in field of view with each viewpoint in the set of viewpoints;
   transmitting the local map data and the first image as the novel viewpoint to an external server;
   receiving a local portion of world map data at the client device from the external server, wherein the world map data is generated by fusing a plurality of local maps generated by one or more client devices and viewpoints captured by one or more client devices, wherein the local portion is selected based on the transmitted local map data;
   determining a distance between a mapping point in the local portion of world map data and the spatial position of the client device in the local portion of world map data based on location data;
   generating a computer mediated reality image at the mapping point in the local portion of world map data based on the image data, the location data, and the distance between the mapping point and the spatial position of the client device; and
   displaying the computer mediated reality image at the mapping point.

2. The method of claim 1, further comprising transmitting the image data to the external server, wherein the local portion of world map data is selected further based on the image data.

3. The method of claim 1, further comprising:
   identifying a second image in the image data as a second novel viewpoint based at least in part on the second image having less than the minimum overlap in field of view with the first set of viewpoints and the first image; and
   transmitting the second image as the second novel viewpoint to the external server.

4. The method of claim 1, wherein the computer mediated reality image comprises a virtual object that is fixed at the mapping point in the local portion of world map data.

5. The method of claim 4, further comprising receiving a virtual object from the external server based on the image data and the location data, wherein the computer mediated reality image comprises the received virtual object.

6. The method of claim 1, wherein generating local map data based on the image data and the location data further comprises:
   identifying one or more objects in the environment based on the image data;
   determining one or more spatial positions for each of the objects based on the image data and the location data; and
   generating a 3D point cloud comprising a set of 3-D points for each of the objects.

7. The method of claim 6, wherein generating local map data based on the image data and the location data further comprises:
   classifying each object into one of a plurality of object types, the plurality of objects types including a stationary type describing objects that are expected to remain in substantially a same spatial position.

8. The method of claim 1, further comprising:
   capturing subsequent location data with the location sensor describing a subsequent spatial position of the client device in the environment;
   determining a subsequent distance between the mapping point in the local portion of world map data and the subsequent spatial position of the client device based on location data and the local portion of world map data;
   adjusting the computer mediated reality image at the mapping point in the local portion of world map data based on the subsequent location data; and
   displaying the adjusted computer mediated reality image at the mapping point.

9. A method comprising:
   storing world map data that describes an aggregate of a plurality of environments at a plurality of geolocations and viewpoint data describing images captured at the plurality of environments;
   receiving, from a client device, local map data, image data of an environment captured by a camera on the client device, location data describing a spatial position of the client device captured with a location sensor, and one or more novel viewpoints, wherein the local map data is generated by the client device based on the image data and the location data and includes one or more 3D point clouds spatially describing one or more objects in the environment around the client device;
identifying a set of viewpoints from the viewpoint data based on the location data;
for each novel viewpoint, determining whether the novel viewpoint has less than a minimum overlap in field of view with each viewpoint in the set of viewpoints;
responsive to determining that a first novel viewpoint has less than the minimum overlap in field of view with each viewpoint in the set of viewpoints, adding the first novel viewpoint to the set of viewpoints;
retrieving a local portion of world map data based on the location data and the local map data;
updating the local portion of the world map data with the local map data by adding one or more of the 3D point clouds in the local map data to the world map data; and
transmitting the local portion of the world map data to the client device.

10. The method of claim 9, further comprising:
generating a virtual object to be displayed by the client device in the environment based on the image data and the location data; and
transmitting the virtual object to the client device.

11. The method of claim 9, further comprising:
determining, for each novel viewpoint, whether a subset of the set of viewpoints having more than the minimum overlap in field of view of the novel viewpoint was captured over a threshold interval of time the novel viewpoint; and
responsive to determining that a first subset of the set of viewpoints having more than the minimum overlap in field of view of a second novel viewpoint was captured over the threshold interval of time from the second novel viewpoint, adding the second novel viewpoint to the set of viewpoints.

12. A non-transitory computer-readable storage medium storing instructions for generating computer mediated reality data on a client device, the instructions, that when executed by a processor, cause the processor to perform operations comprising:
capturing image data with a camera integrated in the client device, the image data representing a near real-time view of an environment around the client device;
capturing location data with a location sensor integrated in the client device, the location data describing a spatial position of the client device in the environment;
generating local map data based on the image data and the location data, the local map data including one or more three-dimensional (3D) point clouds spatially describing one or more objects in the environment around the client device;
accessing a set of viewpoints stored locally on the client device based on the spatial position of the client device;
identifying a first image in the image data as a novel viewpoint based at least in part on the first image having less than a minimum overlap in field of view with each viewpoint in the set of viewpoints;
transmitting the local map data and the first image as the novel viewpoint to an external server;
receiving a local portion of world map data at the client device from the external server, wherein the world map data is generated by fusing a plurality of local maps generated by one or more client devices and viewpoints captured by one or more client devices, wherein the local portion is selected based on the transmitted local map data;
determining a distance between a mapping point in the local portion of world map data and the spatial position of the client device in the local portion of world map data based on location data;
generating a computer mediated reality image at the mapping point in the local portion of world map data based on the image data, the location data, and the distance between the mapping point and the spatial position of the client device; and
displaying the computer mediated reality image at the mapping point.

13. The storage medium of claim 12, further comprising transmitting the image data to the external server, wherein the local portion of world map data is selected further based on the image data.

14. The storage medium of claim 12, further comprising:
identifying a second image in the image data as a second novel viewpoint based at least in part on the second image having less than the minimum overlap in field of view with the first set of viewpoints and the first image; and
transmitting the second image as the second novel viewpoint to the external server.

15. The storage medium of claim 12, wherein the computer mediated reality image comprises a virtual object that is fixed at the mapping point in the local portion of world map data.

16. The storage medium of claim 15, further comprising receiving a virtual object from the external server based on the image data and the location data, wherein the computer mediated reality image comprises the received virtual object.

17. The storage medium of claim 12, wherein generating local map data based on the image data and the location data further comprises:
identifying one or more objects in the environment based on the image data;
determining one or more spatial positions for each of the objects based on the image data and the location data; and
generating a 3D point cloud comprising a set of 3-D points for each of the objects.

18. The storage medium of claim 17, wherein generating local map data based on the image data and the location data further comprises:
classifying each object into one of a plurality of object types, the plurality of objects types including a stationary type describing objects that are expected to remain in substantially a same spatial position.

19. The storage medium of claim 12, further comprising:
capturing subsequent location data with the location sensor describing a subsequent spatial position of the client device in the environment;
determining a subsequent distance between the mapping point in the local portion of world map data and the subsequent spatial position of the client device based on location data and the local portion of world map data;
adjusting the computer mediated reality image at the mapping point in the local portion of world map data based on the subsequent location data; and
displaying the adjusted computer mediated reality image at the mapping point.

* * * * *

UNITED STATES PATENT AND TRADEMARK OFFICE
CERTIFICATE OF CORRECTION

PATENT NO. : 10,885,714 B2  
APPLICATION NO. : 16/029530  
DATED : January 5, 2021  
INVENTOR(S) : Finman et al.

Page 1 of 1

It is certified that error appears in the above-identified patent and that said Letters Patent is hereby corrected as shown below:

In the Claims

Column 10, Claim 7, Line 39: Written as "the plurality of objects types including a stationary type" should possibly be written as --the plurality of object types including a stationary type--

Column 11, Claim 11, Line 28: Written as "was captured over a threshold interval of time the novel viewpoint;" should possibly be written as --was captured over a threshold interval of time from the novel viewpoint;--

Column 12, Claim 18, Line 49: Written as "the plurality of objects types including a stationary type" should possibly be written as --the plurality of object types including a stationary type--

Signed and Sealed this  
Nineteenth Day of July, 2022

Katherine Kelly Vidal  
*Director of the United States Patent and Trademark Office*